Patented Apr. 24, 1923.

1,452,774

UNITED STATES PATENT OFFICE.

FREDERICK WILLIAM ATACK, OF MANCHESTER, ENGLAND, AND CHARLES WILLIAM SOUTAR, OF ST. ANDREWS, SCOTLAND.

INTERMEDIATES AND DYESTUFFS OF THE ANTHRAQUINONE SERIES.

No Drawing. Application filed June 3, 1921. Serial No. 474,757.

*To all whom it may concern:*

Be it known that we, FREDERICK WILLIAM ATACK and CHARLES WILLIAM SOUTAR, subjects of the King of Great Britain, residing at Manchester, in the county of Lancaster, England, and St. Andrews, Scotland, respectively, have invented certain new and useful Improvements in Intermediates and Dyestuffs of the Anthraquinone Series, of which the following is a specification.

This invention relates to improvements in intermediates and dyestuffs of the anthraquinone series.

When 2-aminoanthraquinone is chlorinated in the usual manner, the 1.3-dichloro derivative is obtained. It has now been found that if 2-aminoanthraquinone is treated with chlorine gas in, for example, glacial acetic acid, it is possible to obtain a 3-chloro derivative first.

It has been stated that a 3.chloro derivative of 2.amino-anthraquinone has been obtained from aminochlorbenzoylbenzoic acid, and this body was stated to be a simple substance of M. P. 280–283° C. This body is clearly not the same as that produced by us, which shows a M. P. of about 221° C.; our product has been proved to be the 3.-chloro derivative, so that the body of M. P. 280–283° C. must have a different constitution.

It has further been found that this body can be converted by treatment with bromine into a previously unknown 2-amino-1-bromo-3-chloro-anthraquinone.

It has also been found that this bromo derivative can be transformed into a useful new dyestuff, whose constitution is defined hereafter.

The invention therefore includes the preparation of 3-chloro-2-amino-anthraquinone by direct chlorination, the preparation of the bromo derivative therefrom and the preparation of a dyestuff from said bromo derivative. The invention includes processes in which two or all of these steps are performed consecutively in a common solvent.

The invention includes cases in which the various bodies contain another substituent group e. g. derivatives of acylated amino anthraquinone.

The following examples illustrate the three steps above recited and also a combined process, but it will be appreciated that equivalents may be employed for the reagents and steps which are enumerated.

Example 1.

25 parts by weight of 2-aminoanthraquinone suspended in 360 parts by weight of glacial acetic acid treated with chlorine until the necessary increase in weight has taken place. The mixture is then boiled for thirty minutes when 2-amino-3-chloro-anthraquinone crystallizes in small orange-yellow needles of melting point 221° C.

Example 2.

Chlorine gas was passed at room temperature into a suspension of 10 g. 2-aminoantraquine in 100 g. nitrobenzene, which was kept well shaken, until the necessary increase in weight had taken place. The mixture was then boiled vigorously for ½ hour, after standing overnight the 2-amino-3-chloro-anthraquinone, which had separated in crystalline form, was filtered off, washed with nitrobenzene, alcohol and finally with hot water. After drying, the product had a melting point of 221–222° C.

This melting point was only very slightly altered by sublimation of the product.

Sodium carbonate or other neutralising agent may be added to the nitrobenzene if desired.

Example 3.

20 parts by weight of 2-amino-3-chloro-anthraquinone and 10 parts by weight of anhydrous sodium carbonate suspended in 180 parts by weight of nitrobenzene were treated with 21 parts by weight of bromine dissolved in 60 parts by weight of nitrobenzene. The bromine solution was added at the ordinary temperature over a period of 20 minutes and the mixture then heated at 60° C. for one and a quarter hours. After allowing to stand for several hours the mixture was filtered, washed and dried. 2-amino-1-bromo-3-chloro-anthraquinone was obtained as orange colored needles of melting point 235° C.

Example 4.

10 parts by weight of 2-amino-1-bromo-3-chloro-anthraquinone, 5 parts by weight of fused sodium acetate and 3 parts by weight of crystalline copper acetate are heated with 120 parts by weight of nitrobenzene at the boil until no further dyestuff is produced. After allowing to cool, the dyestuff was filtered off, freed from nitrobenzene and dried. The product dyed cotton bright blue shades from a hydrosulphite vat. The product appears to be 3.3'-dichloro-anthraquinone-1.2.2' 1'N-dihydro-azine, but it is possible that the amine (as distinguished from hydroazine) may be present. Other inert solvents may be used e.g. o.nitrotoluene.

The following example illustrates a process in which the reactions are performed consecutively in a common liquid medium without isolation of intermediate products.

*Example 5.*

25 parts by weight of 2-amino-anthraquinone, suspended in 200 parts of nitrobenzene, are treated with chlorine until the necessary increase in weight has taken place, the mixture is then boiled for 1½ hours. 28 parts of bromine, dissovled in 30 parts of nitrobenzene added at the ordinary temperature over a period of 30 minutes. After 8 parts of anhydrous sodium carbonate have been added the mixture is heated at 100° C for 1 hour, at 150° C. for 1 hour and finally raised to boiling.

40 parts of anhydrous sodium acetate and 10 parts of copper acetate are added and the mixture boiled under a reflux condenser, until dyestuff is no longer produced.

The dystuff is filtered from the warm solution, freed from nitrobenzene and dried. The product dyes cotton bright blue shades from a hydrosulphite vat.

We declare that what we claim is:—

1. The process of preparing a new dyestuff which consists in condensing 2.amino. 1.bromo.3.chloro.anthraquinone.

2. The process of preparing a new dyestuff which consists in limited chlorination of 2.amino.anthraquinone, bromination of 2.amino.3.chloro.anthraquinone and condensation of 2.amino.1.bromo.3.chloro.anthraquinone wherein at least two of said operations are performed consecutively in a common liquid without isolation of the intermediate product.

3. As a new product, the dyestuff 3.3'-dichloro - anthraquinone - 1.2.2'.1'. - N - dihydroazine.

4. The process of preparing a new dyestuff which consists in condensing a body containing the grouping

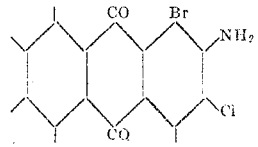

In witness whereof, we have hereunto signed our names this 13th day of May 1921, in the presence of two subscribing witnesses.

FREDERICK WILLIAM ATACK.
CHARLES WILLIAM SOUTAR.

Witnesses:
JOHN McLACHLAN,
W. STIRK.